United States Patent [19]

Tomcik

[11] Patent Number: 4,535,472
[45] Date of Patent: Aug. 13, 1985

[54] ADAPTIVE BIT ALLOCATOR

[75] Inventor: James D. Tomcik, Aberdeen, N.J.

[73] Assignee: AT&T Bell Laboratories, Murray Hill, N.J.

[21] Appl. No.: 439,345

[22] Filed: Nov. 5, 1982

[51] Int. Cl.³ .............................................. G10L 1/00
[52] U.S. Cl. ........................................ 381/31; 375/122
[58] Field of Search ................................... 381/29–35; 375/122

[56] References Cited

U.S. PATENT DOCUMENTS

| | | | |
|---|---|---|---|
| 4,216,354 | 8/1980 | Esteban et al. | 381/31 |
| 4,455,649 | 6/1984 | Esteban et al. | 381/31 |
| 4,464,782 | 8/1984 | Beraud et al. | 381/31 |
| 4,464,783 | 8/1984 | Beraud et al. | 381/31 |

OTHER PUBLICATIONS

"High Quality 16kb/s Voice Transmission: The Sub-band Coder Approach", by R. S. Cheung and R. L. Winslow, IEEE ICASSP, 1980, pp. 319–322.
"16KBPS Real Time QME Sub-Band Coding Impementation", by C. Galand and D. J. Esteban, IEEE ICASSP, 1980, pp. 332–335.
"32 KBPS CCITT Compatible Split Band Coding Scheme" by D. Esteban and C. Galand, IEEE, 1978, pp. 320–325.
"Sub-Band Coding with Adaptive Bit Allocation", by Christoph Grauel, Signal Processing, vol. 2, No. 1, Jan. 1980, North-Holland Publishing Company.
"Application of Quadrature Mirror Filters to Split Band Voice Coding Schemes", by D. Esteban and C. Galand, IEEE ICASSP, 1977, pp. 191–195.

Primary Examiner—E. S. Matt Kemeny
Assistant Examiner—David B. Levin
Attorney, Agent, or Firm—Thomas Stafford

[57] ABSTRACT

Improved efficiency in allocating bits to individual ones of a plurality of sub-band signals (or amplitude coefficients) is realized by employing a so-called template matching technique. A plurality of the most likely to occur bit allocation patterns and a corresponding plurality of templates including representations of a prescribed characteristic of the sub-band signals that would generate a corresponding one of the bit allocation patterns are stored for later use. Selection of a bit allocation pattern for use in encoding and/or decoding the sub-band signals is effected by matching in accordance with a given one of the stored templates to representations of the prescribed characteristic of the sub-band signals presently being encoded. In one example, the prescribed characteristic is a power estimate and the matching criterion is a minimum rate distortion criterion.

20 Claims, 5 Drawing Figures

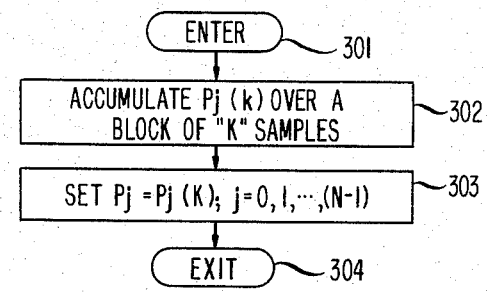
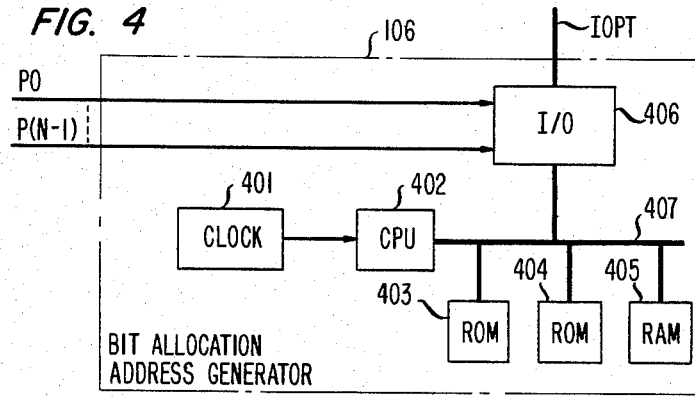
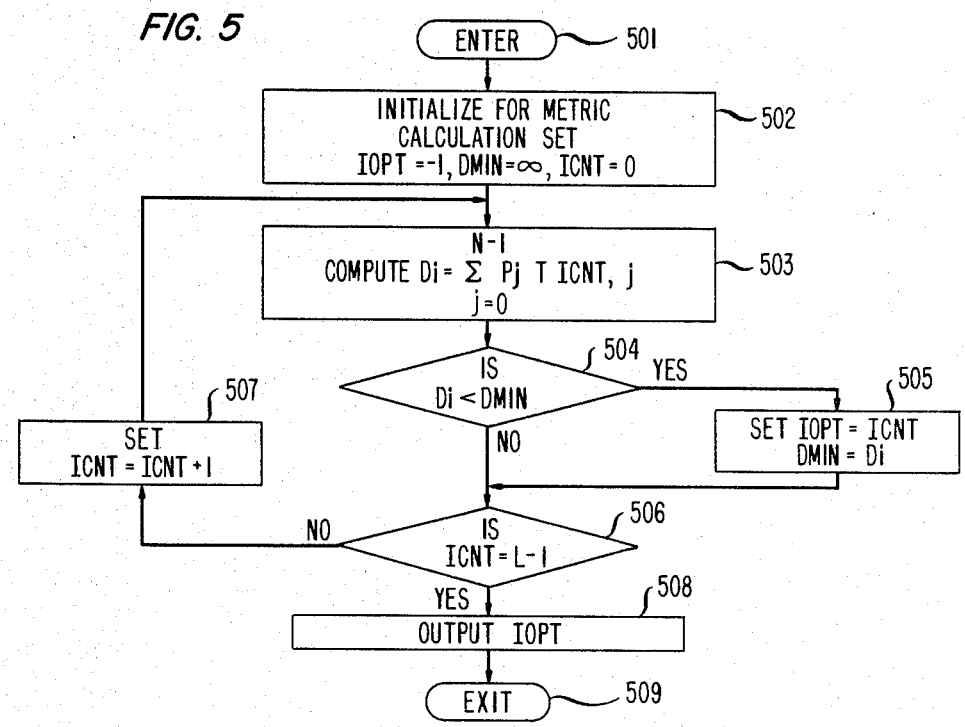

ADAPTIVE BIT ALLOCATOR

TECHNICAL FIELD

This invention relates to low bit rate coding of speech and, more particularly, to sub-band coding including adaptive bit allocation.

BACKGROUND OF THE INVENTION

Sub-band coding of speech includes dividing the speech spectrum into a plurality of frequency sub-bands, encoding the portions of the speech signal in the individual sub-bands and combining the encoded signals for transmission to a remote receiver. At the receiver the coded signals are decoded and reconstructed to generate the speech signal.

As described in an article entitled "Sub-band Coding With Adaptive Bit Allocation", *Signal Processing*, Vol. 2, No. 1, pp. 23-30, January 1980, a number of bits is allocated to each sub-band for the encoding of the portion of the speech spectrum in that sub-band based on a power estimate. The quality and efficiency of transmission of the encoded speech signals are enhanced by employing an adaptive bit allocation technique. However, information, commonly referred to as side information, must also be transmitted with the encoded speech signals in order to reconstruct the speech signal at the receiver. In the prior arrangement representations of power in each of the sub-bands are transmitted to a decoder for use in the speech reconstruction process. Transmission of the power representations for each sub-band requires use of significant transmission capacity. Additionally, bit allocation generation apparatus identical to that in the transmitter is required in the receiver to generate the bit allocation pattern corresponding to the encoded sub-band signals being received. Thus, transmission efficiency is diminished because of the need to transmit the power and receiver complexity is greater than desired.

SUMMARY OF THE INVENTION

Improved efficiency in transmission capacity and equipment use and, consequently, improved quality in speech transmission is realized by employing an adaptive bit allocation arrangement in the low bit rate coding of speech that utilizes a so-called template matching technique in generating bit allocation patterns. More specifically, a plurality of the most likely to occur bit allocation patterns are stored for use as desired. Similarly, a plurality of so-called templates are stored each including representations of a prescribed characteristic of the sub-band signals that would generate in accordance with a prescribed generation criterion, a corresponding one of the stored bit allocation patterns. Selection of a bit allocation pattern to be employed in encoding the sub-band signals is effected by matching, in accordance with a prescribed matching criterion, one of the stored templates to representations of the prescribed characteristic of the sub-band signals of a current speech block to be encoded. The prescribed characteristic is, for example, a power estimate. Any one of a number of template matching criteria may be employed, for example, a minimum distortion criterion or a minimum distance criterion. Then, only information, for example, an address, identifying the stored bit allocation pattern corresponding to the template best matching the prescribed characteristics of the sub-band signals need be transmitted to a remote receiver for use in reconstructing the speech signal.

BRIEF DESCRIPTION OF THE DRAWING

The invention will be more fully understood from the following detailed description of an illustrative embodiment thereof taken in connection with the appended figures in which:

FIG. 3 illustrates a flow chart of a program routine including a sequence of steps employed in the power estimator of FIG. 1;

FIG. 4 shows in simplified block diagram form details of the bit allocation address generator of FIG. 1; and FIG. 5 illustrates a flow chart of a program routine including a sequence of steps employed in the bit allocation address generator of FIG. 4 for generating an address of a bit allocation pattern to be used in the transmitter of FIG. 1 and the receiver of FIG. 2.

DETAILED DESCRIPTION

Figure 1:
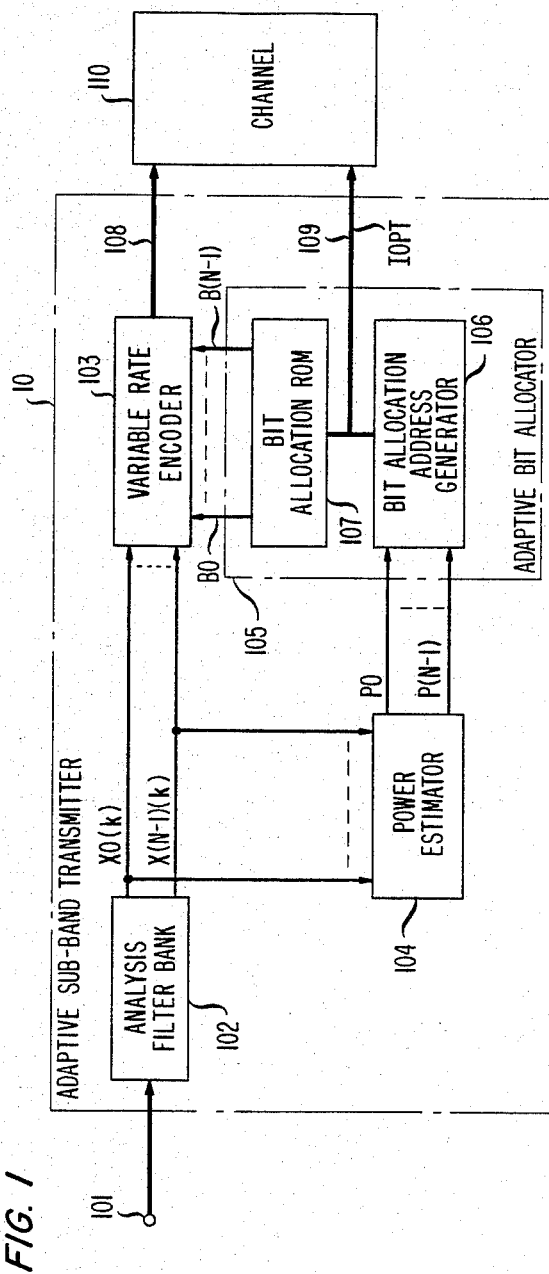
FIG. 1 shows in simplified block diagram form an adaptive sub-band transmitter employing an embodiment of the invention.

FIG. 1 shows in simplified block diagram form adaptive sub-band transmitter 10 employing an embodiment of the invention. Accordingly, a speech signal to be encoded is supplied via terminal 101 to analysis filter bank 102. In this example, filter bank 102 includes a plurality of quadrature mirror filters of a type known in the art for separating the supplied speech signal into a plurality of frequency sub-bands and, consequently, generating sub-band signals $X0(k)$ through $XN-1(k)$. In this example, $N=8$ and (k) is a time index representative of a block of speech, for example, 15 milliseconds. Sub-band signals $X0(k)$ through $XN-1(k)$ are supplied to variable rate encoder 103 and power estimator 104.

Variable rate encoder 103 includes, for example, a shared adaptive differential pulse code modulation (ADPCM) encoder of a type known in the art for encoding sub-band signals $X0(k)$ through $XN-1(k)$. Bits allocated to each of the sub-band signals are supplied from adaptive bit allocator 105, namely, B0 through $BN-1$. In this example, a sub-band signal can be allocated a maximum of five (5) bits and the total number of bits allocated to all the sub-band signals is 14. The encoded signals are supplied via circuit path 108 to transmission channel 110 for transmission to a remote receiver for example, adaptive sub-band receiver 20 of FIG. 2.

Power estimator 104 generates power estimates P0 through $PN-1$ of sub-band signals $X0(k)$ through $XN-1(k)$, respectively, for each block of speech signal in sequence. Although any power estimation scheme may be employed, power estimator 104 preferably includes apparatus for generating a faded exponential average of the power in each sub-band in accordance with $$Pj(k) = \alpha Pj(k-1) + (1-\alpha)X^2j(k) \qquad (1)$$

where $j = 0, 1 \ldots N-1$, and $\alpha$ is a time constant in this example, approximately 0.99.

FIG. 3 illustrates a flow chart of a program routine illustrating the operation of power estimator 104. Accordingly, the routine is entered via 301 and, thereafter, operational block 302 causes values of $Pj(k)$ to be accumulated over a block of k samples, in this example, over a 15 millisecond block of speech. Then, operational block 303 causes each of power estimates Pj to be set to the accumulated value at time K which is at the end of the speech block interval. Thereafter, the routine is exited via 304. Power estimates P0 through PN−1 are supplied to adaptive bit allocator 105 and, therein, to bit allocation address generator 106. Bit allocation address generator 106 is responsive to the power estimates to generate, in accordance with an aspect of the invention, an address of a bit allocation pattern by employing a so-called template matching technique. Details of bit address generator 106 are shown in FIGS. 4 and 5 described below. Address IOPT of the optimum bit pattern for sub-band signals X0 through XN−1 being encoded, is supplied to bit allocation read only memory (ROM) 107 and via path 109 to transmission channel 110, for transmission to a remote receiver.

A plurality of bit allocation patterns are stored in bit allocation ROM 107. The stored bit patterns are those that are most likely to occur in speech. These patterns may be obtained in a number of ways. In this example, a predetermined interval of speech, for example, 20 seconds, was analyzed and all the bit patterns occurring for samples of the speech in the predetermined interval were collected. Then, the bit patterns were ranked in accordance with their relative occurrences. The bit pattern having the lowest frequency of occurrence is removed from the data base. This process is iterated until the number of patterns remaining are a predetermined number L, in this example 64. Consequently, the bit patterns most likely to occur in speech have been selected and are stored in bit allocation ROM 107. Each allocation pattern stored in ROM 107 is identified by a specific address. In this example, 6 bit addresses are employed.

FIG. 4 shows in simplified block diagram form one embodiment of bit allocation generator 106 which, in accordance with an aspect of the invention, generates address IOPT employing a so-called template matching technique. Accordingly, shown are clock 401, central processing unit (CPU) 402, read only memory unit (ROM) 403, read only memory unit (ROM) 404, read-write memory unit, commonly referred to as random access memory (RAM) 405, and input/output (I/O) 406. Units 402 through 406 are all interconnected via bus 407 to form, for example, a computer system or alternatively a high speed digital processor unit of a type known in the art.

Signals representative of power estimates P0 through PN−1 for sub-band signals X0(k) through XN−1(k), respectively, of the block of speech currently being encoded are supplied to I/O 406. Power estimates P0 through PN−1 are matched by a prescribed criterion, in accordance with an aspect of the invention, to a plurality of templates, in this example, representative of unit power estimates of the sub-band signals stored in ROM 403 under control of code instructions of a matching program stored in ROM 404.

The template representations stored in ROM 403 are associated on a one-to-one basis to the bit allocation patterns Bi stored in bit allocation ROM 107. A unique template Ti is generated for each bit allocation pattern Bi by employing a prescribed generating criterion, namely, function F(.). That is to say, function F(.) maps Bi into unit power spectra which could have generated them. Function F(.) is dependent on the matching criterion being used. Thus, for $$Bi = Bi0, Bi1, \ldots BiN-1 \quad (2)$$

the corresponding template when using a rate distortion matching criterion is given by $$TDi = 2^{-2Bij}, \quad (3)$$

where $j = 0, 1, \ldots, N-1$ and i is bit allocation number $i = 0, 1, \ldots, L-1$ where L in this example is 64. Similarly, the corresponding template when using a geometric (distance) matching criterion is given by $$TGi = \frac{2^{2Bij}}{\left[\sum_{j=0}^{N-1} 2^{4Bij}\right]^{\frac{1}{2}}}, \quad (4)$$

where $j = 0, 1, \ldots, N-1$ and $i = 0, 1, \ldots L$.

Briefly, the desired match is realized by employing a distance measure. When using the rate distortion criterion a useful measure is the so-called inner product $$d(P,TDi) = \sum_{j=0}^{N-1} Pj \, TDij. \quad (5)$$

The total average distortion encountered by coding power spectrum P with bit allocation pattern Bi is $$Di = \sum_{j=0}^{N-1} Pj 2^{-2Bij}. \quad (6)$$

Then, the template TDi corresponding to bit allocation pattern Bi is obtained by determining the template TDi in which the total average distortion is a minimum over all of the components $j = 0, 1, \ldots, N-1$ as compared to power estimates P0 through PN−1, respectively. In this example $i = 0, \ldots, 63$ and $j = 0, 1 \ldots, 7$.

Code representations of the sequence of steps shown in the flow chart of FIG. 5 are stored in ROM 404 (FIG. 4). Accordingly, FIG. 5 depicts a flowchart of a program routine for generating, in accordance with an aspect of the invention, address IOPT of one of bit allocation patterns Bi stored in ROM 107 (FIG. 1) and/or ROM 202 (FIG. 2) by identifying a unit power spectra template TDi which most closely matches power estimates P0 through PN−1 of sub-band signals X0 through XN−1, respectively, currently being encoded. The program routine is entered via oval 501 and, thereafter, operational block 502 causes system initialization for the so-called metric calculation (Di), namely setting IOPT=−1, DMIN=∞ and ICNT=0. ICNT is a loop counter for counting the templates Ti where, in this example, $i = 0, 1, \ldots, L$.

Operational block 503 computes the total average distortion Di for template TDi relative to power estimates Pj where $j = 0, 1, \ldots, N-1$.

Conditional branch point 504 tests to determine whether the total average distortion Di for template TDi is less than DMIN. Since initially DMIN=∞ the first test will result in a YES result and control is transferred to operational block 505. If the test yields a NO result control is transferred to conditional branch point 506.

Operational block 505 sets IOPT equal to ICNT. That is, IOPT is set to template TDi identified by counter ICNT which currently yields the minimum average total distortion as compared to P0 through PN−1. DMIN is set to the current minimum Di. Then, control is transferred to conditional branch point 506.

Conditional branch point 506 tests to determine whether all the templates have been compared with power estimates P0 through PN−1 relative to the total average distortion test, namely, does ICNT=L−1 where, in this example, L=64. If the result is NO, control is transferred to operational block 507 which causes counter ICNT to be incremented, i.e., ICNT=ICNT+1. Then, control is returned to operational block 503 where the average total distortion for the next template is determined. Steps 503 through 507 are iterated when appropriate until all the templates have been tested for minimum average total distortion relative to power estimates P0 through PN−1, namely, until ICNT=L−1. Thus, when conditional branch point 506 yields a YES result, IOPT is the address of a bit allocation pattern Bi that corresponds to template TDi which yields the minimum average total distortion relation to power estimates P0 through PN−1. Therefore, bit allocation pattern Bi identified by IOPT is the optimum bit allocation for sub-band signals X0 through XN−1 currently being encoded in transmitter 10 and to be decoded in receiver 20.

Operational block 508 causes the address of IOPT to be outputted. Thereafter, the routine is exited via 509 until it is needed for determining the address IOPT of the optimum bit allocation pattern for the next speech block to be encoded.

When using a geometric criterion, the euclidean distance between power estimates P and templates TGi is to be minimized. This is equivalent to maximizing the so-called cross product $$C_i = \sum_{j=0}^{N-1} P_j TG_{ij}, \quad (7)$$

A program routine for determining IOPT using the geometric criterion is substantially the same as the rate distortion criterion shown in FIG. 5. The differences are in step 502 DMIN=∞ becomes DMAX=−1, step 504 becomes Di>DMAX and in step 505 DMIN=Di becomes DMAX=Di.

The table below shows bit allocation pattern B generated when using a rate distortion matching criterion. Shown are the index of sub-band signals X, namely, 0, 1, ..., N−1, corresponding power estimates P, bit allocation B and template unit power value TD.

| Index of X | P | B | TD |
|---|---|---|---|
| 0 | 1694 | 3 | 0.015625 |
| 1 | 637 | 3 | 0.015625 |
| 2 | 43 | 2 | 0.062500 |
| 3 | 36 | 0 | 1.000000 |
| 4 | 152 | 2 | 0.062500 |
| 5 | 165 | 2 | 0.062500 |
| 6 | 147 | 2 | 0.062500 |
| 7 | 23 | 0 | 1.000000 |

Similarly, the table below shows bit allocation pattern B generated when using a geometric matching criterion. Shown are the index of sub-band signals X, corresponding power estimates P, bit allocations B and template unit power values TG.

| Index of X | P | B | TG |
|---|---|---|---|
| 0 | 1694 | 5 | 0.968251 |
| 1 | 637 | 4 | 0.242063 |
| 2 | 43 | 0 | 0.000946 |
| 3 | 36 | 0 | 0.000946 |
| 4 | 152 | 2 | 0.015129 |
| 5 | 165 | 3 | 0.060516 |
| 6 | 147 | 0 | 0.000946 |
| 7 | 23 | 0 | 0.000946 |

Accordingly, it is seen that the optimum bit allocation pattern selected depends on the matching criterion being used. This follows since the different criteria look to minimize different deleterious effects in transmission of the coded signals.

Figure 2:
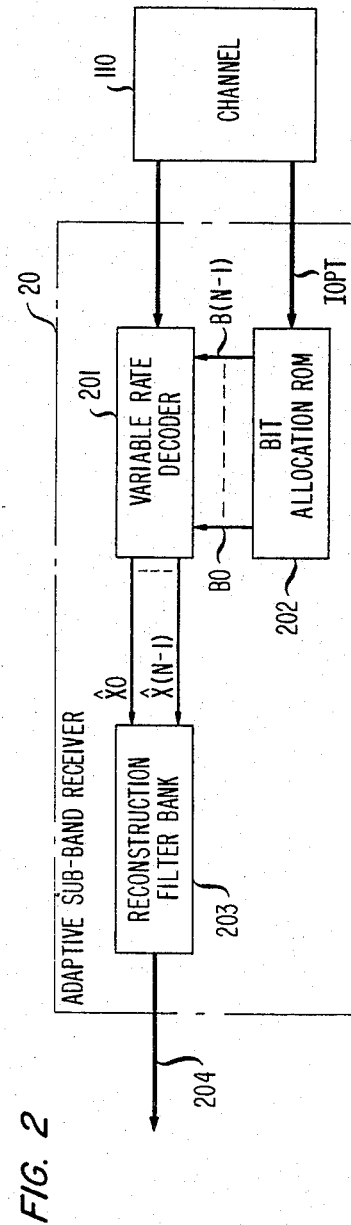
FIG. 2 depicts on adaptive sub-band receiver which utilizes an aspect of the invention.

FIG. 2 shows in simplified block diagram form adaptive sub-band receiver 20 also including an aspect of the invention. Accordingly, shown in transmission channel 110 which supplies the encoded sub-band signals to variable rate decoder 201 and the 6-bit address of the corresponding optimum bit allocation pattern IOPT to bit allocation ROM 202. Bit allocation patterns identical to those stored in bit allocation ROM 107 described above are also stored in ROM 202. Thus, ROM 202 responds to the received IOPT address to generate the bit allocation pattern B=B0, B1, ..., BN−1, corresponding to the received encoded sub-band signals to be decoded. Accordingly, bit allocation pattern B0, B1, ... BN−1 is supplied to variable rate decoder 201.

Decoder 201 is of a type which corresponds to encoder 103 described above and generates decoded sub-band signals X0 through XN−1.

In turn, decoded sub-band signals X0 through XN−1 are supplied to reconstruction filter bank 203 which generates a reconstructed speech signal at output 204 corresponding to the speech signal supplied to a remote transmitter. Reconstruction filter bank 203 includes a plurality of filters corresponding to those included in analysis filter bank 102 described above except that they perform an inverse function.

Thus, it is seen that the only apparatus required in receiver 20 to realize the adaptive bit allocation is bit allocation ROM 202 which responds to the received 6-bit IOPT signal.

The above arrangements are only examples of embodiments of the invention. It will be apparent to those skilled in the art that various changes in form and detail may be made without departing from the spirit and scope of the invention. Indeed, a hardware embodiment is readily obtainable which may be multiplexable for use on several sub-band transmitters. Additionally, although the invention has been described in a sub-band coding environment, it is equally applicable to other coding arrangements, for example, to adaptive transform coding. Moreover, template matching techniques other than the rate distortion and geometric criteria may also be utilized. Moreover, it is apparent that variance measures, magnitude values and the like are also estimates of power.

What is claimed is:

1. Apparatus for allocating bits from a predetermined total number of bits to individual ones of a plurality of signals comprising:

means for generating a representation of a prescribed characteristic of each of the plurality of signals;

means for storing a plurality of predetermined bit allocation patterns and being responsive to an address signal for outputting one of said predetermined bit allocation patterns identified by said address; and means for storing a plurality of templates each including predetermined representations of said prescribed characteristic of said plurality of signals, said templates corresponding on a one-to-one basis to said plurality of bit allocation patterns, and being responsive to said generated representations of said plurality of signals for generating said address by matching, in accordance with a first prescribed criterion, said generated representations to said representations of one of said stored templates.

2. The invention as defined in claim 1 wherein said prescribed characteristic is a power estimate.

3. The invention as defined in claim 2 wherein said generating means includes means for generating a faded exponential average power estimate.

4. The invention as defined in claim 2 wherein said templates each include predetermined power estimate representations of the plurality of signals which would generate said corresponding bit allocation pattern in accordance with a second prescribed criterion.

5. The invention as defined in claim 2 wherein said first prescribed criterion includes determining a minimum distortion characteristic between said generated power estimate representations and said template power estimate representations.

6. The invention as defined in claim 5 wherein said second criterion is $$TDi = 2^{-2Bij}$$

where TD is the template, B is the number of bits allocated, $i=0, 1, \ldots, L-1$ where L is the total number of templates and corresponding bit allocation patterns, and $j=0, 1, \ldots, N-1$ where N is the number of said plurality of signals.

7. The invention as defined in claim 6 wherein said first criterion is $$Di = \sum_{j=0}^{N-1} Pj 2^{-2Bij}$$

where Di is the total average distortion encountered by coding power estimates P with bit allocation pattern Bi, $j=0, 1, \ldots, N-1$ and $i=0, 1, \ldots, L-1$.

8. The invention as defined in claim 2 wherein said first prescribed criterion includes determining a minimum distance characteristic between said generated power estimate representations and said template power representations.

9. The invention as defined in claim 8 wherein said second criterion is $$TGi = \frac{2^{2Bij}}{\left[\sum_{j=0}^{N-1} 2^{4Bij}\right]^{\frac{1}{2}}}$$

where TG is the template, B is the number of bits allocated, $i=0, 1, \ldots, L-1$ where L is the total number of templates and corresponding bit allocation patterns, and $j=0, 1, \ldots, N-1$ where N is the number of said plurality of signals.

10. The invention as defined in claim 9 wherein said minimum distance criterion is effected by maximizing $$Ci = \sum_{j=0}^{N-1} PjTGij$$

where C is a so-called cross product, P is a power estimate, TG is a template power estimate, $i=0, 1, \ldots, L-1$ and $j=0, \ldots, N-1$.

11. A method for allocating bits from a predetermined total number of bits to individual ones of a plurality of signals, comprising the steps of:

generating a representation of a prescribed characteristic of each of the plurality of signals;

matching in accordance with a first prescribed criterion said generated representations to a plurality of templates to generate a bit allocation pattern address, each of said templates including predetermined representations of said prescribed characteristic of said plurality of signals and corresponding in accordance with a second criterion to a predetermined bit allocation pattern for said plurality of signals, each of said bit allocation patterns having a unique address; and outputting one of said bit allocation patterns in response to said generated bit allocation pattern address.

12. The method as defined in claim 11 wherein said first prescribed criterion includes determining a minimum relationship between said generated representations and said template representations.

13. The method as defined in claim 12 wherein said prescribed characteristic is a power estimate.

14. The method as defined in claim 12 wherein said minimum relationship is a minimum distortion relationship.

15. The method as defined in claim 12 wherein said minimum relationship is a minimum distance relationship.

16. In a transmission system of the type comprising a transmitter for encoding a plurality of signals to be transmitted to a remote receiver, the transmitter including apparatus for allocating bits from a predetermined total number of bits to individual ones of the plurality of signals and the receiver including apparatus for allocating corresponding bits to received encoded signals for use in decoding the encoded signals, a method comprising the steps of:

in the transmitter, generating a representation of a prescribed characteristic of each of the plurality of signals to be encoded;

matching in accordance with a first prescribed criterion said generated representations to a plurality of templates to generate a bit allocation pattern address, each of said templates including predetermined representations of said prescribed characteristic of said plurality of signals to be encoded and corresponding in accordance with a second criterion to a predetermined bit allocation pattern, each of said bit allocation patterns having a unique address;

outputting one of said bit allocation patterns in response to said generated address for use in encoding said plurality of signals; and transmitting said generated address to said receiver;

in the receiver, outputting a bit allocation pattern in response to said received generated address which corresponds to the bit allocation pattern used to encode said plurality of signals to be used in decoding the received encoded signals.

17. The invention as defined in claim 16 wherein said prescribed characteristic is a power estimate.

18. The invention as defined in claim 16 wherein said first prescribed criterion includes determining a minimum relationship between said generated representations and said template representations.

19. The invention as defined in claim 18 wherein said minimum relationship is a minimum distortion relationship.

20. The invention as defined in claim 18 wherein said minimum relationship is a minimum distance relationship.

* * * * *